G. P. Gordon. Sheet 1. 2 Sheets.

Printing Press.

No. 624. Reissued Nov. 16, 1858.

Witnesses:

O. D. Munn

J. W. Hamilton.

Inventor:

Geo. P. Gordon

N. PETERS, PHOTO-LITHOGRAPHER, WASHINGTON, D. C.

Sheet 2. 2 Sheets.
G. P. Gordon.
Printing Press.
No. 624. Fig. 3. Reissued Nov. 16, 1858.
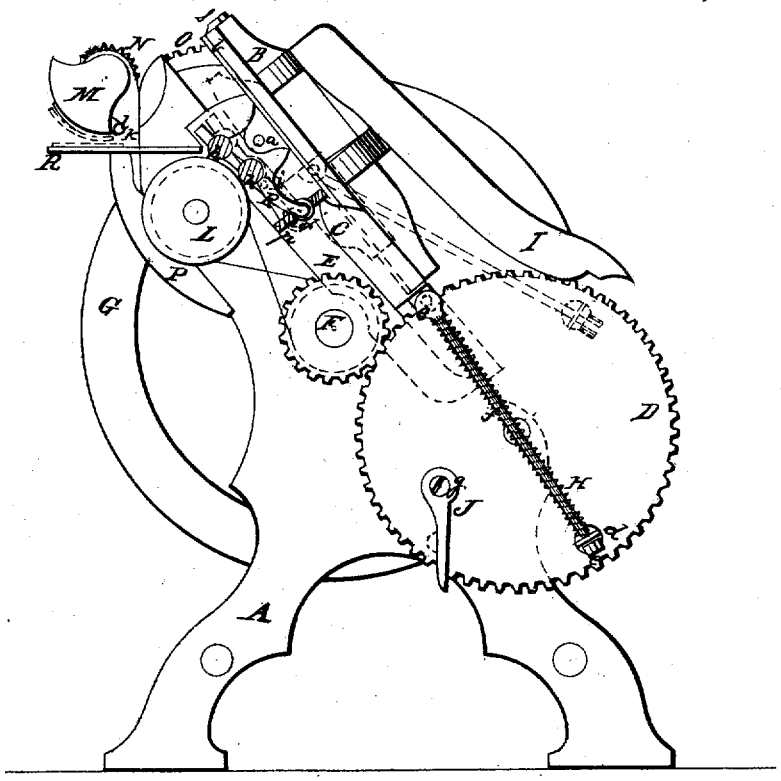
Fig. 4.
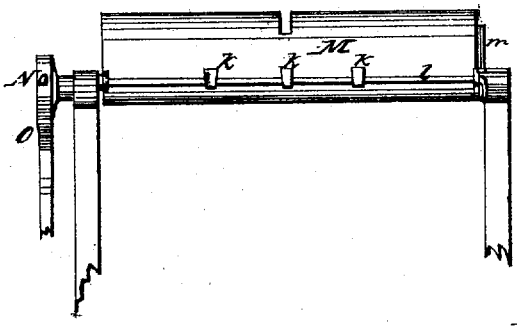
Witnesses:
O. D. Munn
J. W. Hamilton
Inventor:
Geo. P. Gordon
N. PETERS, PHOTO-LITHOGRAPHER, WASHINGTON, D. C.

UNITED STATES PATENT OFFICE.

GEORGE P. GORDON, OF NEW YORK, N. Y.

IMPROVED PRINTING-PRESS.

Specification forming part of Letters Patent No. 11,064, dated June 13, 1854; Reissue No. 624, dated November 16, 1858.

*To all whom it may concern:*

Be it known that I, GEORGE P. GORDON, of the city, county, and State of New York, have invented certain new and useful Improvements in Printing-Presses; and I do hereby declare that the following is a full, clear, and exact description of the construction and operation of the same, reference being had to the annexed drawings, making a part of this specification, in which—

Figure 2:
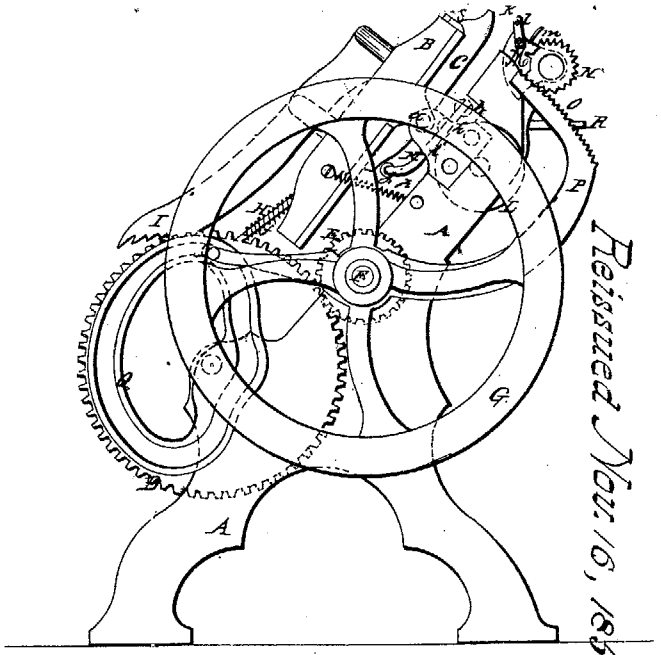
Figure 1:
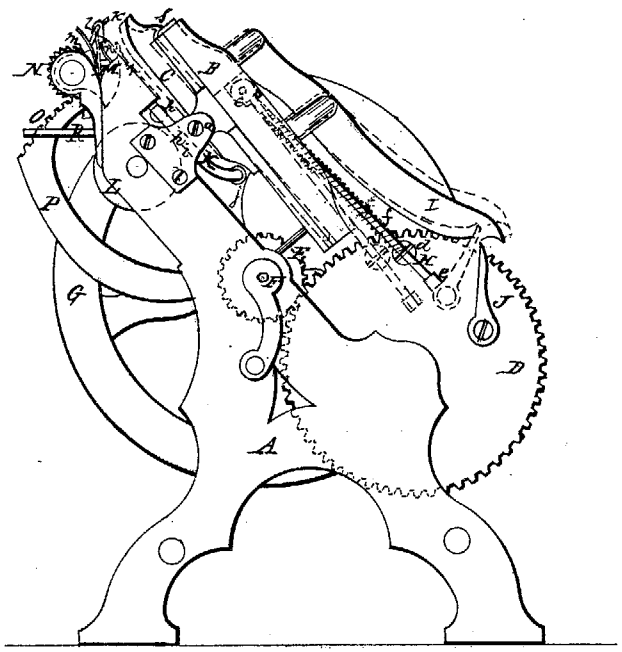

Figure 1 is a side view of my improved press. Fig. 2 is also a side view of the same, the side shown being opposite to that shown in Fig. 1. Fig. 3 is a vertical longitudinal section of the same, the plane of section being through the center, or nearly at that point. Fig. 4 is a detached back view of the fly or carrier of the sheet of paper.

Similar letters of reference indicate corresponding parts in the several figures.

This invention relates to certain new and useful improvements in printing-presses; and it consists, first, in the employment or use of a sheet-conveyer or fly having a rotary reciprocating motion, and arranged, as will be hereinafter shown, or in some equivalent way, for the purpose of relieving the sheet from the type when printed or removing the printed sheets and piling them upon a proper place of deposit; second, in giving with one inking-cylinder two distributions to the inking-rollers for each impression, one prior to the passing of the form and one prior to the repassing of the form; third, in the combination of a spiral spring, connecting-rod, and crank-motion for operating the bed or carriage, as will be hereinafter shown.

To enable others skilled in the art to make and use my invention, I will proceed to describe its construction and operation.

A, Figs. 1 and 3, represents the frame of the press, the upper part which is inclined, and B is a swinging or vibrating frame, attached to the frame A by pivots *a*, a pivot passing through each side piece of the frame. The vibrating frame B is directly over the upper and inclined portion of the frame A, and a spring, *p*, is attached to the frames B and A. (See Fig. 2 and 3.) Within the vibrating frame B there is a bed or carriage, C, which works in grooves *b* in the inner sides of the side pieces of the vibrating frame B. One groove is shown in Fig. 3. At the upper parts of the grooves *b* are stops *s s*, one of which is shown in Figs. 1, 2, and 3. The top and bottom ends of the bed or carriage C are rounded, as shown in Figs. 1, 2, and 3.

D is a toothed wheel, which is hung in the frame A, the axle of the toothed wheel having its bearing in one of the side pieces of the frame.

E is a pinion, which gears into the toothed wheel D. The pinion E is hung upon a shaft, F, which passes transversely through the frame A, and has at one end a fly-wheel, G.

H is a connecting-rod, one end of which is attached by a joint or pivot, *c*, to the lower end of the bed or carriage C, and the opposite end passes through an eye, *d*, attached to the side of the toothed wheel D, near its periphery. A nut, *e*, is upon the lower end of the rod. Around the connecting-rod H there is a spiral spring, *f*, the upper end of which bears against the shoulder of the joint *c*, and the lower end against the eye *d*.

I is a curved arm attached to the vibrating frame B. The lower end of the arms I is about on a line with the periphery of the toothed wheel D, directly over its center.

J, Figs. 1 and 3, is a toggle attached by a pivot, *g*, to one side of the toothed wheel D.

K, Figs. 1, 2, and 3, is a frame containing two inking-rollers, *h h*. The frame K has a shaft, *i*, passing transversely through it, the ends of said shaft *i* working loosely in the side pieces of the frame A. At the lower ends of the side pieces of the frame K are rollers *j j*, one roller to each side piece. In the frame A, and directly below the inking-rollers *h h'*, is placed the inking-cylinder L, against which the inking-rollers *h h* bear when not operated upon by the movement of the bed or carriage C, as will be presently shown.

M is a fly attached to the upper part of the frame A, (See Figs. 1, 2, and 3.) The fly is in the form of a segment of a cylinder, and extends across the whole breadth of the frame. On one end of the fly is a pinion, N, which gears into a segment-rack, O, at the upper end of a lever, P, which has its bearing or fulcrum on the shaft F of the pinion E and fly-wheel G. The lower end of the lever P fits in a grooved cam, Q, which is hung on the axle of the toothed wheel D, (See Fig. 2.) The fly M is provided with nippers *k*, which are attached to a rod *l*, operated by a spring, *m*, and pin *n*, (see Fig. 1.)

R is a fly-board placed underneath the fly *m*.

Operation: The paper is placed upon the platen at the upper part of the frame A at Z, (see Fig. 1,) the red lines denoting the sheet of paper, and motion is given to the shaft F in any proper manner, and the connecting-rod H moves the bed or carriage C, which holds the form upward and over the paper. When at this point the toggle J acts against the lower end of the arm I and forces the upper end of the frame B towards the platen Z and the form is pressed upon the paper, the bed or carriage containing the form remaining stationary during the time the impression is given, in consequence of the eye *e* acting against the spiral spring *f* upon the connecting-rod H and the upper part of the bed or carriage bearing against the stops *s s*. The nippers *k* take and hold the sheet at the point of impression and while the sheet is resting upon the platen, and relieve it from the type after it is printed, and the nippers or fly by the operation of the cam Q, pinion N, and rack O, then revolves a part of a revolution backward and carries the sheet around with it and deposits it upon the fly-board R, (See Fig. 3.) As the bed-carriage C passes downward, the sides of the bed bear upon the rollers *j* of the frame K, and the inking-rollers *h h* are in consequence lifted from the inking-roller and bear against the form, and when the form has passed below the inking-rollers said rollers, by their own gravity, fall upon the inking-cylinder L, and are again raised from it and pressed against the form upon the upward movement of the bed or carriage. Thus two distributions are given to the inking-rollers for every impression, and the form inked twice, one inking on the downward movement and one on the upward movement of the bed or carriage. The return movement is given the fly M on the upward movement of the bed or carriage.

It is peculiar to this machine that nippers or grippers are caused to advance and receive the sheet of paper, and after it is printed place each sheet in a regular pile, in such manner as has heretofore been done by hand, and whether this be done by a segment of a cylinder or other convenient arms, or means equivalent, to convey the grippers after they have received the sheet and the impression has been given to the fly-board, I consider immaterial, as many substitutes would be readily contrived by a skillful mechanician. Therefore, whether I use a segment of a cylinder or arms, or some equivalent, I consider to be an immaterial part of my invention, so long as the grippers shall be carried from one point to the other and back again, each time receiving a sheet and conveying it to a suitable place of deposit.

I claim—

1. I do not claim the use of a fly upon which a sheet of paper has been previously placed for laying the sheet upon the pile-board, for this is well known; but I do claim the use of rotating reciprocating nippers for such purpose when used either separately or in combination with a rotating reciprocating fly.

2. I do not claim laying the sheet directly upon the platen, in order that it may receive the impression, as this is well known; but I do claim relieving the sheet from the type and taking the sheet directly from the platen, or either of them, with or by the same nippers which shall carry such sheet to its place of deposit or piling.

3. Giving with one inking-cylinder two distributions to the inking-rollers for each impression—viz., one distribution prior to passing the form and one distribution prior to the return of the form to its first position.

4. The arrangement of the spring, connecting-rod, crank, and stops, as described, to operate the bed and give the necessary dwell for the impression.

GEO. P. GORDON.

Witnesses:

F. O. DEGENER,

A. TURNER.